United States Patent [19]
Hayward

[11] 4,191,797
[45] Mar. 4, 1980

[54] HEAT AND ELECTRICAL RESISTANT TABLE AND BENCH TOP AND METHOD OF MAKING SAME

[75] Inventor: Glenn L. Hayward, Jim Falls, Wis.

[73] Assignee: Burd, Inc., St. Charles, Ill.

[21] Appl. No.: 14,094

[22] Filed: Feb. 22, 1979

[51] Int. Cl.² .............................................. B32B 7/12
[52] U.S. Cl. .................................... 428/50; 428/248; 428/511; 428/529; 428/537; 428/920
[58] Field of Search ................. 428/50, 511, 529, 537, 428/248, 920

[56] References Cited

U.S. PATENT DOCUMENTS

| | | | |
|---|---|---|---|
| 3,769,143 | 10/1973 | Kuiesza | 428/81 |
| 3,947,012 | 3/1976 | Cobb | 428/81 |
| 4,033,082 | 7/1977 | Tashiro | 428/81 |
| 4,089,721 | 5/1978 | Sauder | 428/537 |

OTHER PUBLICATIONS

"Industria Top", Howell Div. of Burd, 1976.

*Primary Examiner*—George F. Lesmes
*Assistant Examiner*—E. Rollins Buffalow
*Attorney, Agent, or Firm*—Hill, Van Santen, Steadman, Chiara & Simpson

[57] ABSTRACT

A table or bench top provides a work surface of high strength that is resistant to impacts, high temperatures, alkalies, acids, flames, and electrical arcs. The top has a core composed of wood strips bonded together in side by side and end to end relation with thermosetting resins, a bottom particle board sheet and a top laminated fabric resin sheet cold bonded to the faces of the core, and side and edge wood finishing strips between the top and bottom sheets surrounding the core in bonded relation therewith. The finished top is especially useful as a work surface for welding, soldering, brazing, and has a high dielectric strength making it especially useful in the electronics industry.

11 Claims, 11 Drawing Figures

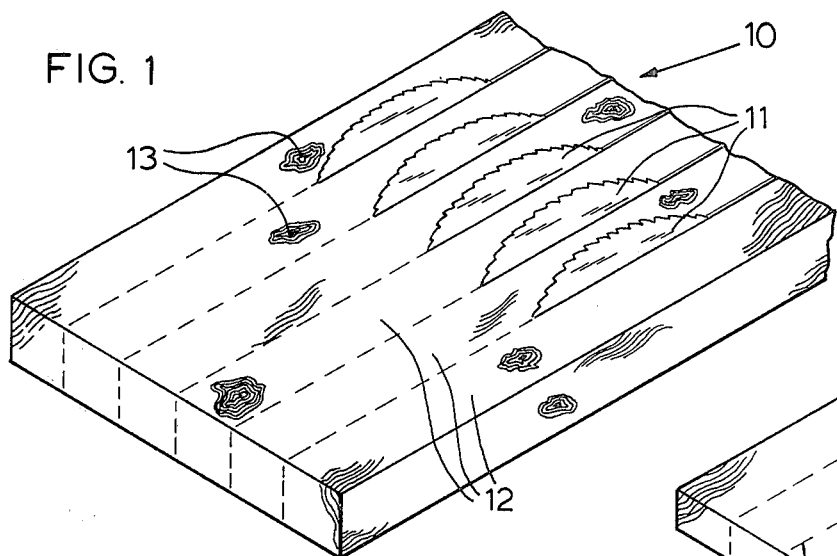
FIG. 1
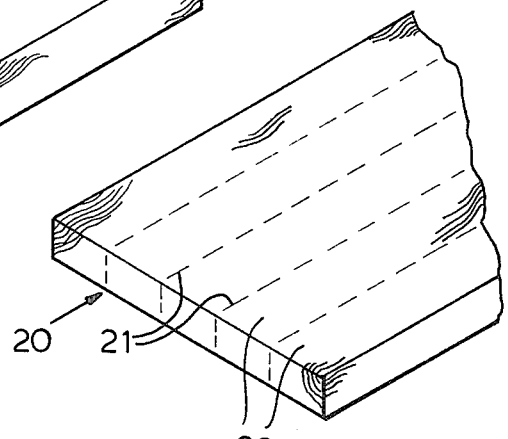
FIG. 4
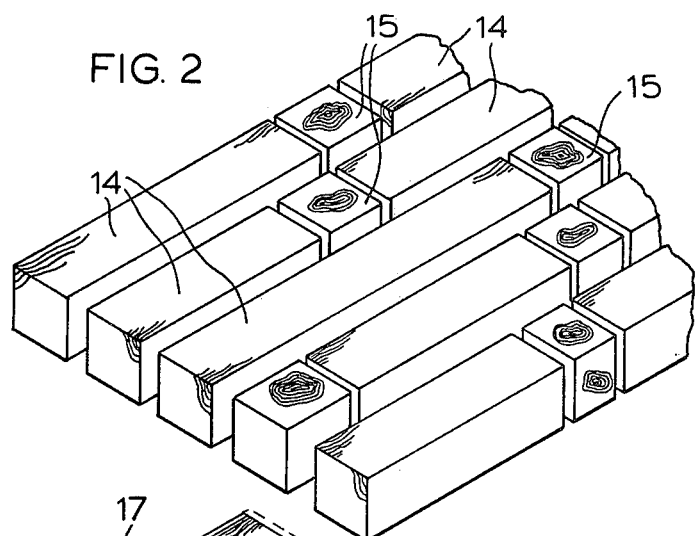
FIG. 2
FIG. 3
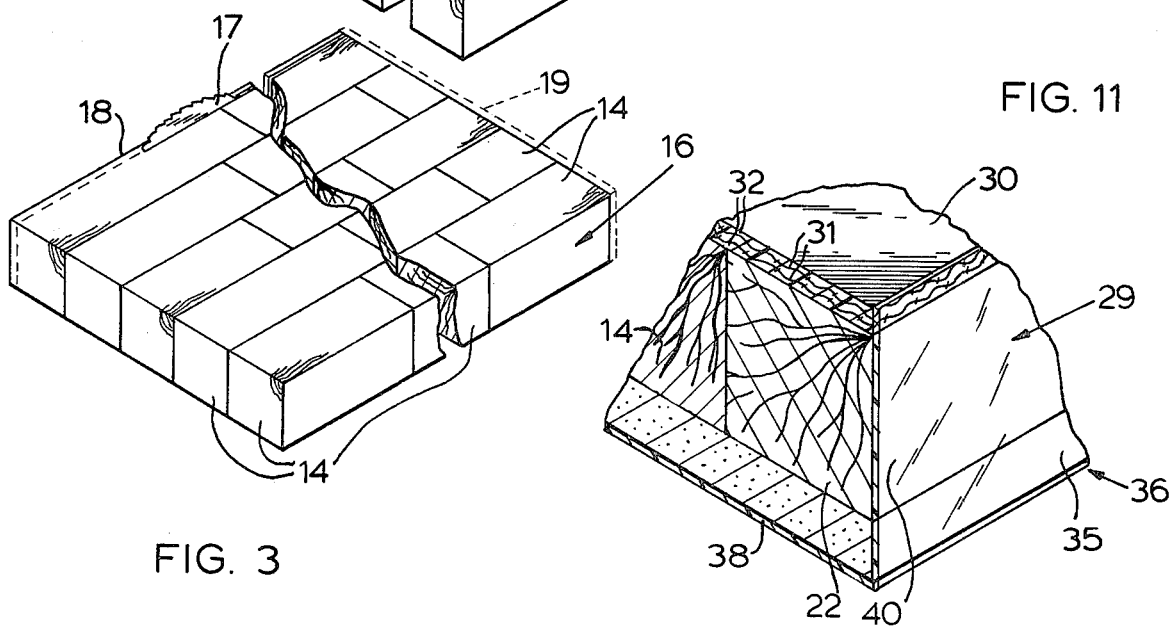
FIG. 11

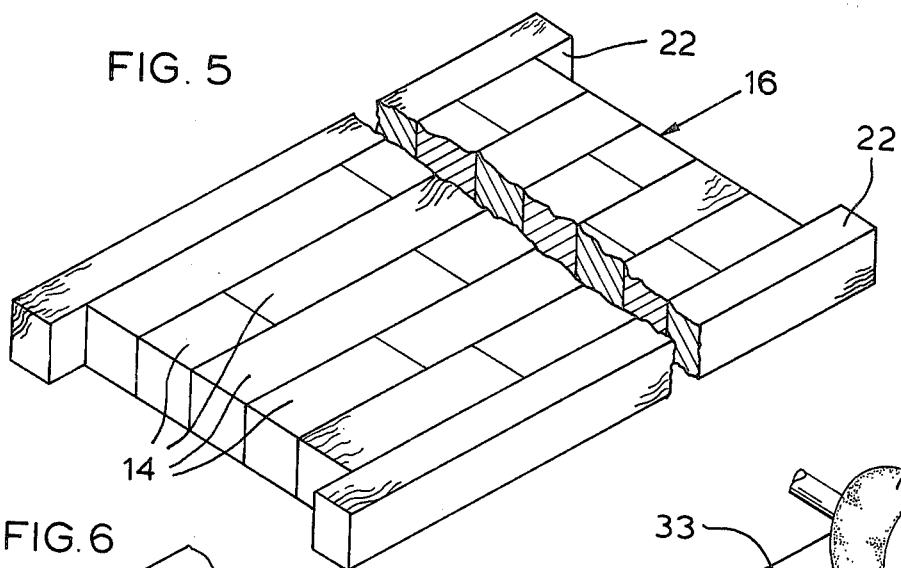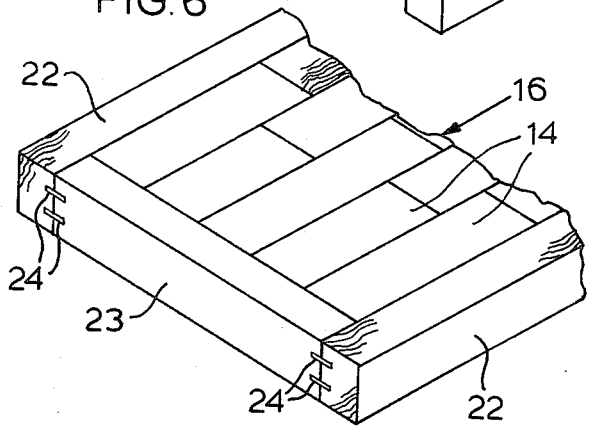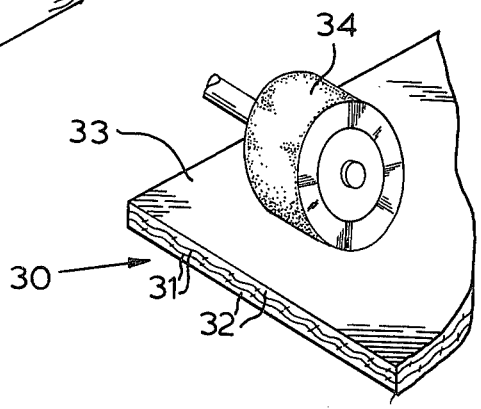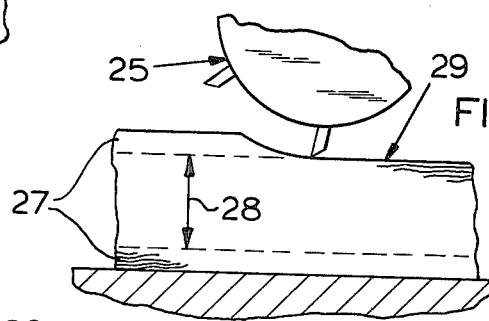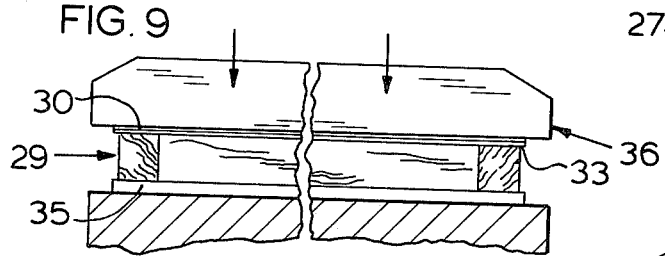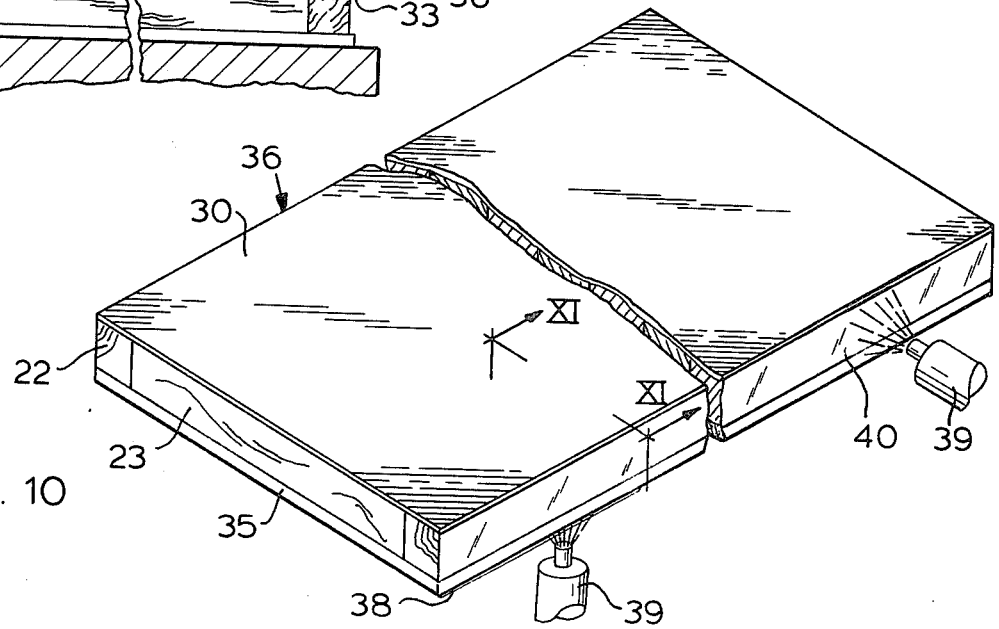

HEAT AND ELECTRICAL RESISTANT TABLE AND BENCH TOP AND METHOD OF MAKING SAME

FIELD OF THE INVENTION

This invention relates to the art of industrial tops for tables, workbenches, platforms, and the like and deals especially with a bench or table top having a wood core composed of bonded together wooden strips and top and bottom non-metallic sheets cold bonded to the core with the top sheet having high impact, temperature, corrosive, and electrical resistance.

PRIOR ART

Heretofore available industrial tops for tables and workbenches were not suitable for operations such as welding, soldering and brazing because they could not resist high temperatures, corrosive chemicals, or electrical current. In addition metal tops were noisy, would quickly rust, and were completely unsuitable for arc welding. Non-metallic tops could not withstand high temperatures.

DESCRIPTION OF THIS INVENTION

According to this invention an industrial top is provided with a wood strip core, a particle board bottom and a laminated fabric plastics material top sheet. The core is made by gang sawing hard wood boards into narrow strips, chop sawing the strip into shorter lengths for removing defective sections, laying up the shortened strips in end to end and side by side planar relation, surrounding the laid up strip with single side and end wood strips, bonding all of the strips together, plane finishing the surfaces of the strips, covering the top and bottom of the finished faces of the resulting core slab with a bottom sheet of particle board and a top sheet of reinforced fabric laminated high temperature resisting plastics material, and cold bonding the sheets to the core. One side face of the laminated plastics sheet is roughened prior to bonding. A sealer such as a vinyl resin is then coated on the bottom surface of the particle board on the peripheral sides of the resulting table or bench top unit.

The shortened strips are preferably bonded together to form a planar board or slab which is then trimmed to an undersize so that when the side and edge finishing strips are applied the finished core slab will have the finished dimensions of the table or bench top.

The strips forming the core slab are preferably a hard wood such as Aspen. The particle board is preferably a phenolic resin bonded sheet of particulate material such as sawdust. A board manufactured by Rodman Industries with the following properties is very satisfactory for the back or bottom laminate of the table or bench top:

Specific gravity—0.94
Density—lbs./cu.ft.—62
Thickness—$\frac{3}{8}$"
Modules of rupture—psi—3820
Modules of elasticity—1000 psi—535
Janka ball hardness—lbs.[1]—2490
Impact indentation—0.005"
Direct screw withdrawal—lbs.[2]—570
Abrasion resistance[3]—0.057
Linear expansion—%—0.52%

[1]Caused by 72" drop of a 2" steel ball
[2]One-inch #10 wood screw imbedded $\frac{5}{8}$" 7/64" diameter hold
[3]Wear from 1000 cycles of abrasion disc The top reinforced fabric plastics sheet or board need only be from $\frac{1}{8}$ to $\frac{1}{4}$" thick and is composed of a plurality of layers of cotton fabric laminated together by a melamine resin. The following is a typical specification for the work surface sheet:

Izod Impact ft., lbs./inch—1.0
Compression Strength, psi—42000
Rockwell Hardness on Scale—100-115
Arc Resistance, seconds—120
Alkali Resistance
　Mild—excellent
　Strong—good
Acid Resistance
　Mild—fair
　Strong—poor
Flame Resistance Work
　Surface Thickness—$\frac{1}{8}$"

The following is a typical specification for the hardwood blocks forming the core:

Thickness—$1\frac{1}{4}$"
Width-inches—$1\frac{3}{4}$"
Length-inches—6" per block min.
Moisture Content—% 6-9

The single length edge strips have a width of $1\frac{3}{4}$" with the end bands or strips fitted between the side strips and stapled in place.

It is then an object of this invention to provide an industrial work surface which is capable of withstanding high temperature and is resistant to electrical current.

Another object of this invention is to provide a non-metallic table or bench top suitable for use in welding, brazing and soldering, and having a core of wood blocks mounted in side by side and end to end relation, a particulate board bottom, and a fabric laminate plastics top.

Another object of the invention is to provide an industrial table or bench top which will resist electrical arcs, high temperatures, corrosive chemicals, heavy loads, impacts, and warping.

A specific object of this invention is to provide an industrial work surface having a core composed of wood blocks bonded together with a thermosetting resin, and a top surface laminated fabric plastics sheet cold bonded to the core.

Another object of the invention is to provide a method of making industrial work surfaces which will resist high temperatures and electrical currents by cold bonding a laminated fabric plastics sheet to a wood block core.

A specific object of this invention is to provide a method of making industrial tops for workbenches and tables by cold bonding a cotton fabric laminated melamine plastics sheet to a wood block core.

BRIEF DESCRIPTION OF THE DRAWINGS

FIGS. 1-4 are fragmentary perspective views illustrating the formation of the core blocks and edge strips or side bands for the core of the table or bench top of this invention.

FIG. 5 is a broken perspective view illustrating the application of the side bands or strips to the wood block core.

FIG. 6 is a fragmentary perspective view illustrating the application of the end bands or strips to the core.

FIG. 7 is a somewhat diagrammatic view illustrating the plane finishing of the top and bottom faces of the core.

FIG. 8 is a fragmentary perspective view illustrating the scuffing or roughing operation for the top surface sheet.

FIG. 9 is a diagrammatic view illustrating the cold pressing operation in the method of this invention.

FIG. 10 is a broken perspective view of a bench or table top of this invention illustrating the application of a finish coating to the bottom surface and sides thereof.

FIG. 11 is a cross sectional view along the line XI—XI of FIG. 10.

AS SHOWN ON THE DRAWINGS

In FIG. 1 the reference numeral 10 designates generally a hardwood board, such as Aspen which is gang ripped by a plurality of circular saws 11 into a plurality of longitudinal strips 12. These strips 12 may contain imperfections such as knots 13 at spaced intervals along their length.

As shown in FIG. 2 the strips 12 are crosscut or chopped into blocks 14 to remove the sections of imperfections containing the knots, as illustrated at 15. The short blocks 14 may be of random lengths depending upon the locations of the cut out knot sections 15.

According to this invention, the random length blocks 14 are placed in end to end, and side by side relation and are united by a thermosetting resin in a hot press operation to form a rough planar core 16 of larger size than the desired table or bench top to be formed therewith. The ends and sides of this planar core 16 are trimmed by a saw 17 to remove side and end sections 18 and 19, thereby producing a core smaller in size than the finished top by length and width dimensions which will accommodate the addition of side and end bands or strips to cover the periphery of the core.

As shown in FIG. 4 a hardwood board, also preferably of "Aspen" wood is longitudinally sawed along lines 21 to form bands or strips 22, sufficiently longer than the length of the trimmed core 16 to extend slightly beyond both ends thereof to form projections that will cover the ends of end strips or bands extending across the trimmed ends of the core 16.

As shown in FIG. 5 side bands 22 cover the sides of the core 16 and project slightly beyond.

As shown in FIG. 6 the projected ends of the side bands or strips 22 receive therebetween end bands or strips 23 which are stapled thereto by fasteners such as 24.

The side bands 22 and the end bands 23 surround the core slab 16 and are bonded thereto with the same type of thermosetting resin which bond the core blocks 14 together. A urea-formaldehyde glue is preferable.

The core 16 with the side and end strips therearound is next, as shown in FIG. 7, passed through a planer machine 25 which finishes both faces of the core 16 trimming off the surfaces 27 of these faces and reducing the core to the desired thickness 28 for the finished core product 29.

As shown in FIG. 8 a laminate fabric sheet or board 30 composed of a plurality of layers of cotton fabric 31 bonded together and imbedded in plastics material 32 has one face 33 thereof scuffed or roughened by a rotary brush 34.

Then, as shown in FIG. 9 the sheet or board 30 has its roughened face 33 deposited on top of the finished core 29 while a plastics particle board 35 is positioned under the core 29 in a glue press 36. Polyvinyl glue coatings are provided between the core and the covering sheets 30 and 35 and the press 36 is closed for a period sufficiently long to set the glue. A press time of about 20 minutes minimum plus a cure time of about 4 hours after the stack leaves the press is generally sufficient.

The glued stack is then run through trim saws and coping heads to provide a top 36 shown in FIG. 10 of the desired length and width. Edges of this top are filed to eliminate sharpness and any voids between the trim bands 22 and 23 are patched and the patches are sanded flush with the surrounding areas.

The bottom face of the particle board is then covered with a coating 38 of clear vinyl sealer applied by a spray head 39. When this coating 38 is dry, a coating 40 of the clear vinyl sealer is formed on the side and end edges and is applied by the same or a different spray head 39.

As shown in FIGS. 10 and 11 the finished bench or table top 36 is thus composed of the finished core 29 with the side and end bands 22 and 23 therearound, with the fabric laminate plastic board or sheet 30 on the top thereof, with the board 35 on the bottom thereof and with the sealer coating 38 covering the bottom of the board and the sealer coating 40 covering the side and end bands.

In a preferred embodiment the core is made up of Aspen hardwood blocks with a minimum length of 6 inches, and a minimum width of 1¾ inches. The glued up blocks or slats are trimmed to a size of about 1¼ inches under the net dimension desired for the finished core to allow for application of the clear end and side bands. These bands are formed to a width of about 1¾ and are sawed to the required lengths. Then the blocks with the bands therearound are finish planed to a thickness of 1¼ inches. The side bands, as explained above, project beyond the ends of the glued up slats or blocks and the end bands fit between these projected end portions.

The bonding of the top and bottom boards or sheets to the core is effected at room temperatures to avoid any warpage.

The finished top 36 will have a thickness of about 1¾ inches and has great structural strength with all of the compression resistance, impact resistance, corrosive chemical resistance, high temperature resistance and electrical resistance described hereinabove.

I claim as my invention:

1. An industrial table or bench top having a work surface resistant to high temperatures and electrical current which comprises a core of longitudinally extending wood blocks in side by side and end to end relation, adhesive bonds uniting said blocks into the form of a planar slab, a bottom sheet of plastics material bonding particle board covering the bottom face of said planar slab, a top sheet of plastics material bonded laminar cotton fabric covering the top face of said planar slab, and cold setting glue bonds uniting said top and bottom sheets to said planar slab.

2. The industrial top of claim 1 including one piece side bands and end bands covering the periphery of said planar slab between said top and bottom sheets.

3. The industrial top of claim 1 wherein said wood blocks have rectangular cross sections and random lengths.

4. The industrial top of claim 1 wherein the top sheet is composed of layers of cotton fabric laminated together by a melamine resin.

5. The industrial top of claim 1 wherein the work surface is resistant to flame and electric current arcs.

6. The industrial top of claim 1 wherein the bottom sheet is a phenolic bonded particle board having a density of about 62 lbs./cu. ft.

7. The industrial top of claim 1 having a thickness of about 1¾ inches composed of a bottom sheet of about ⅜ inches in thickness, a top sheet of about ⅛ inches in thickness, and a planar slab of about 1¼ inches in thickness.

8. The industrial top of claim 1 wherein the top sheet has a roughened face receiving the glue bond.

9. The method of manufacturing an industrial table or bench top of high dielectric strength, impact resistance, compression resistance, corrosive chemicals resistance and high temperature resistance which comprises gang saw ripping a hardwood board into a plurality of longitudinal strips, transversely sawing said strips into random length short blocks to remove defective knot sections therefrom, gluing a plurality of said blocks in side by side and end to end relation forming a planar core slab, trimming the core to a smaller size than the finished top, gluing single length wood bands to the sides and ends of the core slab, and bonding a plastics material bottom board to the bottom of the core slab and a fabric reinforced plastics material laminar board to the top of said core slab.

10. The method of claim 9 including the step of simultaneously bonding the bottom and top boards to the planar slab with a cold setting adhesive in a press.

11. The method of claim 9 including the step of extending the side bands beyond the ends of the core slab and stapling end bands between said extended ends.

* * * * *